(12) United States Patent
Tajima et al.

(10) Patent No.: US 6,984,957 B2
(45) Date of Patent: Jan. 10, 2006

(54) APPARATUS FOR CONTROLLING PERMANENT-MAGNET ROTARY MACHINE

(75) Inventors: Shigeru Tajima, Wako (JP); Hideki Inoue, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 125 days.

(21) Appl. No.: 10/674,020

(22) Filed: Sep. 30, 2003

(65) Prior Publication Data
US 2004/0061461 A1    Apr. 1, 2004

(30) Foreign Application Priority Data
Oct. 1, 2002    (JP)    ............... 2002-288805

(51) Int. Cl.
H02P 7/36    (2006.01)

(52) U.S. Cl. ............... 318/700; 318/701; 318/702; 318/805; 318/254

(58) Field of Classification Search ............... 318/700, 318/701, 715, 801, 804, 805, 721–724, 807, 318/811, 661, 439, 254, 299, 34, 49
See application file for complete search history.

(56) References Cited

U.S. PATENT DOCUMENTS

| | | | | |
|---|---|---|---|---|
| 5,585,709 | A * | 12/1996 | Jansen et al. | 318/807 |
| 5,969,500 | A * | 10/1999 | Ishikawa et al. | 318/807 |
| 6,184,647 | B1 * | 2/2001 | Oguro et al. | 318/727 |
| 6,198,256 | B1 * | 3/2001 | Miyazaki et al. | 318/140 |
| 6,456,030 | B1 * | 9/2002 | Masaki et al. | 318/700 |
| 6,677,724 | B1 * | 1/2004 | Kim et al. | 318/700 |
| 6,700,400 | B2 * | 3/2004 | Atarashi | 318/254 |
| 6,707,265 | B2 * | 3/2004 | Imai et al. | 318/254 |
| 2002/0113569 | A1 * | 8/2002 | Iijima et al. | 318/727 |
| 2005/0007044 | A1 * | 1/2005 | Qiu et al. | 318/254 |
| 2005/0029972 | A1 * | 2/2005 | Imai et al. | 318/254 |
| 2005/0057208 | A1 * | 3/2005 | Seibel et al. | 318/432 |

FOREIGN PATENT DOCUMENTS

| | | |
|---|---|---|
| JP | 06-165561 | 6/1994 |
| JP | 10-080188 | 3/1998 |
| JP | 10-262398 | 9/1998 |
| JP | 2000-102299 | 4/2000 |
| JP | 2000-166278 | 6/2000 |
| JP | 2001-008486 | 1/2001 |

* cited by examiner

*Primary Examiner*—Marlon T. Fletcher
*Assistant Examiner*—Eduardo Colon Santana
(74) *Attorney, Agent, or Firm*—Arent Fox PLLC

(57) ABSTRACT

While a rotor 4 of a permanent-magnet rotary machine 1 is rotating and an armature current thereof is substantially zero, a motor controller 2 performs a dq vector control process to control the permanent-magnet rotary machine 1 in a dq coordinate system which has a d-axis representing the direction of a magnetic field of the rotor 4 and a q-axis representing a direction perpendicular to the d-axis, and determines a magnetic pole position correcting quantity θofs to correct a magnetic pole position θact detected by a magnetic pole position detector 8 so that a d-axis voltage command value Vdc determined by the dq vector control process will be substantially zero. The motor controller 2 controls the phases of armature voltages Vuc, Vvc, Vwc with magnetic pole positions corrected by the magnetic pole position correcting quantity θofs. Irrespective of whether the rotary machine 1 is a cylindrical machine or a salient-pole machine, the detected values of magnetic pole positions are appropriately corrected according to a simple process without the need for a voltage detector for thereby efficiently controlling operation of the permanent-magnet rotary machine 1.

12 Claims, 6 Drawing Sheets

APPARATUS FOR CONTROLLING PERMANENT-MAGNET ROTARY MACHINE

BACKGROUND OF THE INVENTION

1. Field of the Invention

The present invention relates to an apparatus for controlling a permanent-magnet rotary machine be, and more particularly to an apparatus for controlling an electric motor or generator having a permanent-magnet rotor.

2. Description of the Related Art

Permanent-magnet rotary machines, e.g., 3-phase DC brushless motors, having a permanent magnet and an armature respectively in a rotor and a stator are required to control the phase of a voltage applied to the armature (more specifically a voltage applied to the winding of each phase of the armature, hereinafter referred to as "armature-applied voltage") depending on the positions of the magnetic poles of the rotor (more specifically the angular positions of the magnetic poles) in order to control the generated torque and the rotational speed thereof. The permanent-magnet rotary machines have a magnetic pole position detector for detecting the positions of the magnetic poles of the rotor, and control the phase of the armature-applied voltage depending the detected positions of the magnetic poles. The magnetic pole position detector comprises a Hall-effect device, an encoder, or the like.

Control processes used for the control of the rotary machines of the type described above will be described below. One known control process for controlling permanent-magnet rotary machines is a so-called d-q vector control process. The d-q vector control process is a control process for controlling a rotary machine by an equivalent circuit on a dq coordinate system which has a d-axis representing the direction of the magnetic field of the rotor and a q-axis representing the direction perpendicular to the d-axis. More specifically, according to the d-q vector control process, the rotary machine is converted into a two-phase equivalent circuit comprising a d-axis armature present on the d-axis and a q-axis armature present on the q-axis. In order to cause a d-axis current flowing through the d-axis armature and a q-axis current flowing through the q-axis armature to comply with respective command values, the d-q vector control process generates a d-axis voltage command value for a voltage to be applied to the d-axis armature and a q-axis voltage command value for a voltage to be applied to the q-axis armature according to a feedback control law. Currents flowing through the respective phases of the actual armature of the rotary machine (hereinafter referred to as "armature currents") are detected by current detectors. The detected currents are then converted in coordinates based on the positions of the magnetic poles of the rotor (which represent the angular position of the d-axis), thus grasping (detecting) the d-axis current and the q-axis current that correspond to the actual armature currents. Based on the detected values of the d-axis current and the q-axis current and the command values for the d-axis current and the q-axis current, the d-axis voltage command value and the q-axis voltage command value in the dq coordinate system are determined according to a feedback control law (e.g., a PI control law) in order to bring the detected values of the d-axis current and the q-axis current into conformity with the command values for the d-axis current and the q-axis current. The d-axis voltage command value and the q-axis voltage command value are then converted into armature voltage command values as command values for the voltages to be applied to the respective phases of the actual armature based on the positions of the magnetic poles of the rotor. The voltages to be applied to the respective phases of the armature, i.e., the magnitudes and phases of the voltages to be applied, are controlled depending on the armature voltage command values by a PWM inverter circuit or the like.

There are also known other control processes than the dq vector control process for controlling the permanent-magnet rotary machines. Any of those control processes are required to grasp the positions of the magnetic poles of the rotor.

While a permanent-magnet rotary machine with a magnetic pole position detector is being controlled, the positions of the magnetic poles that are detected by the magnetic pole position detector often suffer an error with respect to the actual positions of the magnetic poles due to an error caused in the positioning of the magnetic pole position detector when it is assembled and a limitation on the accuracy with which the magnetic pole position detector is manufactured. If the detected positions of the magnetic poles undergo such an error, then the rotary machine has its power factor and efficiency lowered by controlling the phases of the armature voltages with the detected positions of the magnetic poles.

Japanese laid-open patent publication No. 2001-8486, for example, discloses a known technique of correcting the detected positions of magnetic poles. The disclosed technique is based on the fact that, with a rotary machine having a rotor whose magnet is of a cylindrical shape (cylindrical machine), a torque T generated by the rotary machine is proportional to a q-axis current Iq, and if armature voltages are controlled to minimize armature currents (phase currents) when a load torque is constant, then the ratio of a d-axis current command value and the armature currents or the ratio of the d-axis current command value and a q-axis current command value has a certain correlation to an error angle between the positions of the magnetic poles which are detected by a magnetic pole position detector and the actual positions of the magnetic poles. According to the disclosed technique, the error angle is calculated based on the value of the above ratio, and the detected positions of the magnetic poles are corrected by the calculated error angle to control the rotary machine.

According to the disclosed technique, the detected positions of the magnetic poles can be corrected without the need for voltage detectors for detecting armature voltages of the rotary machine.

However, the disclosed technique cannot be applied to a salient-pole machine having a rotor whose magnetic poles are salient poles because the torque T generated by the rotary machine is proportional to the q-axis current Iq. Specifically, as described in the above publication, the torque T generated by a permanent-magnet rotary machine is expressed by the following equation (A):

$$T = \Phi \cdot Iq + (Ld - Lq) \cdot Id \cdot Iq \quad (A)$$

where $\Phi$: magnetic flux, Ld, Lq: d- and q-axis inductance, Id, Iq: d- and q-axis current.

With a cylindrical machine having a cylindrical magnet, since Ld=Lq, the torque T is proportional to the q-axis current Iq. With a salient-pole machine having a salient-pole magnet, since Ld≠Lq, the torque T is not proportional to the q-axis current Iq. Consequently, the above-mentioned basis of the technique disclosed in the above publication is not valid for salient-pole machines, and the disclosed technique is unable to correct the detected positions of the magnetic poles properly for salient-pole machines.

The technique disclosed in the above publication is based on the condition that the load torque of the rotary machine is constant in order to determine the error angle as a corrective quantity for correcting the detected positions of the magnetic poles. If the rotary machine is mounted on a vehicle as a prime mover for generating propulsive forces for the vehicle, e.g., as a rotary machine for generating an assistive output for a parallel hybrid vehicle or a rotary machine for generating propulsive forces for a series hybrid vehicle, then since the load torque of the rotary machine varies depending on the running conditions of the vehicle, it is difficult to keep constant the load torque of the rotary machine. Therefore, even if the rotary machine that is mounted on a vehicle is a cylindrical machine whose magnet is of a cylindrical shape, it is difficult to correct the detected positions of the magnetic poles properly.

SUMMARY OF THE INVENTION

It is therefore an object of the present invention to provide a control apparatus for controlling operation of a permanent-magnet rotary machine efficiently by properly correcting the detected positions of magnetic poles according to a simple process without the need for a voltage detector, irrespective of whether the rotary machine is a cylindrical machine or a salient-pole machine.

A basic concept of the present invention will be described below with reference to FIGS. 1(a) and 1(b) of the accompanying drawings. In FIGS. 1(a) and 1(b), d-q coordinates represent d-q coordinates (hereinafter referred to as "actual coordinates d-q") with a d-axis indicating the actual direction of the magnetic field of a rotor, and dc-qc coordinates represent dq coordinates (dq coordinates in the dq vector control process, hereinafter referred to as "command-axis coordinates dc-qc") determined by the positions of magnetic poles (hereinafter referred to as "detected magnetic pole positions") that are detected by a magnetic pole position detector.

A permanent-magnet rotary machine is in a state in which the rotor thereof is rotating and an armature current I (a current flowing through each phase of the armature) of the rotary machine is "0" (such a state will be referred to as "zero-current state"). In the zero-current state, a voltage V applied to the armature (a voltage applied to each phase of the armature) is equal to a counter-electromotive force E generated by the magnetic field of the rotor. It is assumed that the detected magnetic pole positions have no error with respect to true magnetic pole positions. That is, as shown in FIG. 1(a), actual coordinates d-q and command-axis coordinates dc-qc are in conformity with each other. At this time, a d-axis voltage command value Vdc (a voltage command value on the command axis dc) determined by the dq vector control process is Vdc=0, and a q-axis voltage command value Vqc (a voltage command value on the command axis qc) determined by the dq vector control process is Vqc=E.

Therefore, the magnetic pole positions can correctly be detected if the d-axis voltage command value Vdc determined by the dq vector control process in the zero-current state is "0". This means that in order to grasp the magnetic pole positions correctly, the detected magnetic pole positions may be corrected in order to make the d-axis voltage command value Vdc equal to "0" in the zero-current state.

It is now assumed that the detected magnetic pole positions have an error with respect to true magnetic pole positions in the zero-current state. For example, as shown in FIG. 1(b), the command-axis coordinates dc-qc have an error of an angle θofs (hereinafter referred to as "magnetic pole position error angle θofs") with respect to the actual coordinates d-q. At this time, the d-axis voltage command value Vdc determined by the dq vector control process is Vdc≠0, and the q-axis voltage command value Vqc is Vqc≠E. The square root $\sqrt{(Vdc^2+Vqc^2)}$ of the sum of the square of Vdc and the square of Vqc is equal to the magnitude of the counterelectromotive force E. Furthermore, the ratio (Vdc/Vqc) of the d-axis voltage command value Vdc and the q-axis voltage command value Vqc is equal to the tangent tanθofs of the magnetic pole position error angle θofs. That is, the following equation (1) is satisfied:

$$\theta ofs = \tan^{-1}(Vdc/Vqc) \quad (1)$$

The magnitude of the counterelectromotive force E, and hence the magnitudes of the d-axis voltage command value Vdc and the q-axis voltage command value Vqc, depend upon the rotational speed of the rotor. The equation (1) is satisfied irrespective of the rotational speed of the rotor insofar as the permanent-magnet rotary machine is in the zero-current state. The equation (1) is equivalent to the following equation (2) or (3):

$$\theta ofs = \sin^{-1}\{Vdc/(\sqrt{(Vdc^2+Vqc^2)})\} \quad (2)$$

$$\theta ofs = \cos^{-1}\{Vqc/(\sqrt{(Vdc^2+Vqc^2)})\} \quad (3)$$

Consequently, the magnetic pole position error angle θofs can be determined according to the equation (1) or (2) or (3) from the d-axis voltage command value Vdc and the q-axis voltage command value Vqc that are determined by the dq vector control process in the zero-current state. The correct magnetic pole positions can be grasped by correcting the detected magnetic pole positions by the magnetic pole position error angle θofs thus determined. For example, if the angular position of a magnetic pole at a detected magnetic pole position is represented by θact, then an angle θact−θofs that is produced by subtracting a magnetic pole position error angle θofs from the angular position θact represents a correct magnetic pole position (true magnetic pole position).

The above principles are effective irrespective of whether the magnet of the rotor is of the cylindrical type or the salient-pole type.

The present invention is based on the above principles, and will be described below. In the description that follows, reference characters shown in FIGS. 1(a) and 1(b) will be referred to when necessary for a better understanding of the present invention. According to the present invention, there is provided an apparatus for controlling a permanent-magnet rotary machine, comprising a permanent-magnet rotary machine having a permanent magnet and an armature respectively in a rotor and a stator, magnetic pole position detecting means for detecting a magnetic pole position of the rotor, current control means for controlling an armature current flowing through the armature while controlling the phase of an armature voltage to be applied to the armature depending on the magnetic pole position of the rotor, and correcting quantity determining means for performing a dq vector control process to control the permanent-magnet rotary machine in a dq coordinate system which has a d-axis representing the direction of a magnetic field of the rotor and a q-axis representing a direction perpendicular to the d-axis while the rotor is rotating and the armature current is substantially zero (i.e., in the zero-current state), and determining a magnetic pole position correcting quantity (θofs) to correct the magnetic pole position (detected magnetic pole position) detected by the magnetic pole position detecting means so that a d-axis voltage command value (Vdc) determined by the dq vector control process will be substantially zero, the current control means comprising means for controlling the phase of the armature voltage with a magnetic pole position which is produced by correcting the magnetic pole position detected by the magnetic pole position detecting means with the magnetic pole position correcting quantity determined by the correcting quantity (θofs) determining means.

With the present invention, since the magnetic pole position correcting quantity (θofs) is determined so that the d-axis voltage command value (Vdc) determined by the dq vector control process in the zero-current state will be substantially zero, a magnetic pole position that is obtained by correcting the detected magnetic pole position with the magnetic pole position correcting quantity (θofs) is in conformity with an actual magnetic pole position (true magnetic pole position) of the rotor irrespective of whether the permanent-magnet rotary machine is a cylindrical machine or a salient-pole machine. Therefore, by controlling the phase of the armature voltage using the corrected magnetic pole position, operation of the rotary machine (a torque or a speed thereof) can be controlled without impairing the efficiency and power factor of the rotary machine. As the magnetic pole position correcting quantity (θofs) is determined so that the d-axis voltage command value (Vdc) will be substantially zero, it is not necessary to detect the actual voltage applied to the armature with a voltage detector.

According to the present invention, therefore, the detected value of a magnetic pole position is appropriately corrected according to a simple process without the need for a voltage detector for thereby efficiently controlling operation of the permanent-magnet rotary machine irrespective of whether the permanent-magnet rotary machine is a cylindrical machine or a salient-pole machine. Since the armature current is substantially zero in the zero-current state, a d-axis current command value and a q-axis current command value is substantially zero (preferably "0") in the dq vector control process in the zero-current state. According to the present invention, inasmuch as the dq vector control process may be performed when the magnetic pole position correcting quantity is determined, another control process than the dq vector control process may be employed when the rotary machine is operated normally other than when the magnetic pole position correcting quantity is determined.

Specifically, the magnetic pole position correcting quantity (θofs) may be determined as follows: According to a first procedure, the correcting quantity determining means comprises means for performing the dq vector control process by setting the magnetic pole position correcting quantity to a predetermined temporary setting value in the zero-current state, and determining a true value of the magnetic pole position correcting quantity according to a predetermined equation (the equation (1), the equation (2) or the equation (3)) based on a d-axis voltage command value (Vdc) and a q-axis voltage command value (Vqc) which are determined when the dq vector control process is performed.

The temporary setting value may be "0", for example, or may not be "0". If the temporary setting value is set to "0", the magnetic pole position (the detected magnetic pole position) detected by the magnetic pole position detecting means is used as it is, i.e., the detected magnetic pole position is regarded as being correct, and the dq vector control process is performed. In this case, the magnetic pole position correcting quantity (θofs) determined by the equation (1) or (2) or (3) is determined as representing a true magnetic pole position correcting quantity (a correct magnetic pole position correcting quantity) for correcting the detected magnetic pole position. If the temporary setting value is set to a value which is not "0" (a constant value), the dq vector control process is performed using a magnetic pole position that is produced by correcting the detected magnetic pole position with the temporary setting value, i.e., regarding a magnetic pole position that is produced by correcting the detected magnetic pole position with the temporary setting value, as being correct. In this case, a correcting quantity which is the sum of the magnetic pole position correcting quantity (θofs) determined by the equation (1) or (2) or (3) and the temporary setting value is determined as representing a true magnetic pole position correcting quantity (a correct magnetic pole position correcting quantity) for correcting the detected magnetic pole position.

According to a second procedure, the correcting quantity determining means comprises means for performing the dq vector control process by changing the magnetic pole position correcting quantity to a plurality of values in the zero-current state, and searching for and determining a true value of the magnetic pole position correcting quantity (θofs) which causes a d-axis voltage command value (Vdc) which is determined when the dq vector control process is performed to be substantially zero. Specifically, the magnetic pole position correcting quantity (θofs) is set to various values on a trial basis, and each time the magnetic pole position correcting quantity (θofs) is set, the dq vector control process is performed to search for the magnetic pole position correcting quantity (θofs) that causes the d-axis voltage command value (Vdc) to be substantially zero. If the d-axis voltage command value (Vdc) becomes substantially zero when the magnetic pole position correcting quantity (θofs) is set to a certain value, then that set value of the magnetic pole position correcting quantity (θofs) is obtained as a true value thereof. According to the second procedure, the equations (1) through (3) are not required to be calculated.

According to the present invention, the correcting quantity determining means should preferably comprise means for determining the magnetic pole position correcting quantity when the rotor rotates at a rotational speed which is equal to or lower than a predetermined speed. Specifically, in a high rotational speed range of the rotary machine, since a counterelectromotive force (E) of the armature is large, in order to cause the armature current (I) to be substantially zero, it is necessary to intentionally set a d-axis current to a negative value to control the rotary machine to weaken the magnetic field of the magnetic poles i.e., to perform a field weakening control process. In this field weakening control process, the equations (1) through (3) are not satisfied. By determining a magnetic pole position correcting quantity when the rotational speed of the rotor is equal to or lower than a predetermined speed, the determined magnetic pole position correcting quantity is highly reliable. The predetermined speed may be about 2000 rpm, for example.

According to the present invention, the correcting quantity determining means should preferably comprise means for determining the magnetic pole position correcting quantity when the rotor rotates at a rotational speed which is substantially constant. Specifically, when the rotational speed of the rotor is substantially constant, since the counterelectromotive force of the armature is substantially constant, the d-axis voltage command value (Vdc) and the q-axis voltage command value (Vqc) in the zero-current state are also substantially constant. Consequently, the equations (1) through (3) are satisfied highly accurately. Accordingly, the correcting quantity determining means is able to determine a highly reliable, i.e., highly accurate magnetic pole position correcting quantity.

According to the present invention, the permanent-magnet rotary machine should preferably comprise a rotary machine mounted on a vehicle for generating a propulsive force for propelling the vehicle. The rotary machine may be a rotary machine mounted on a parallel hybrid vehicle for generating assistive power for assisting in the output of the engine when necessary or a rotary machine mounted on a series hybrid vehicle as a propulsive prime mover. According to the present invention, since the magnetic pole position correcting quantity can be determined in a situation where the rotary machine is not required generate a torque, the magnetic pole position correcting quantity can be determined in various situations.

The correcting quantity determining means may comprise means for determining the magnetic pole position correcting quantity when the production of the vehicle to which the permanent-magnet rotary machine is mounted is completed or the vehicle is inspected for maintenance. The correcting quantity determining means may determine the magnetic pole position correcting quantity when the vehicle is running idly with no torque generated by the rotary machine, i.e., when the vehicle is running by inertia with the accelerator pedal being not operated.

If the permanent-magnet rotary machine comprises a rotary machine having a rotor connected to an output shaft of an engine, the rotary machine and the engine being mounted on a parallel hybrid vehicle, then the correcting quantity determining means may comprise means for determining the magnetic pole position correcting quantity while the engine is operating with no torque generated by the permanent-magnet rotary machine. The rotor of the permanent-magnet rotary machine may be connected to the output shaft of the engine directly or through a power transmitting means such as a clutch, a pulley, or the like. Stated otherwise, the rotor may be connected to the output shaft of the engine either directly or indirectly.

With the permanent-magnet rotary machine mounted on the parallel hybrid vehicle, the magnetic pole position correcting quantity may be determined while the vehicle is being propelled by the drive power of the engine, e.g., while the vehicle is cruising. However, the magnetic pole position correcting quantity should preferably be determined while the engine is idling as the rotational speed of the engine and the rotary machine is stable.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 2:
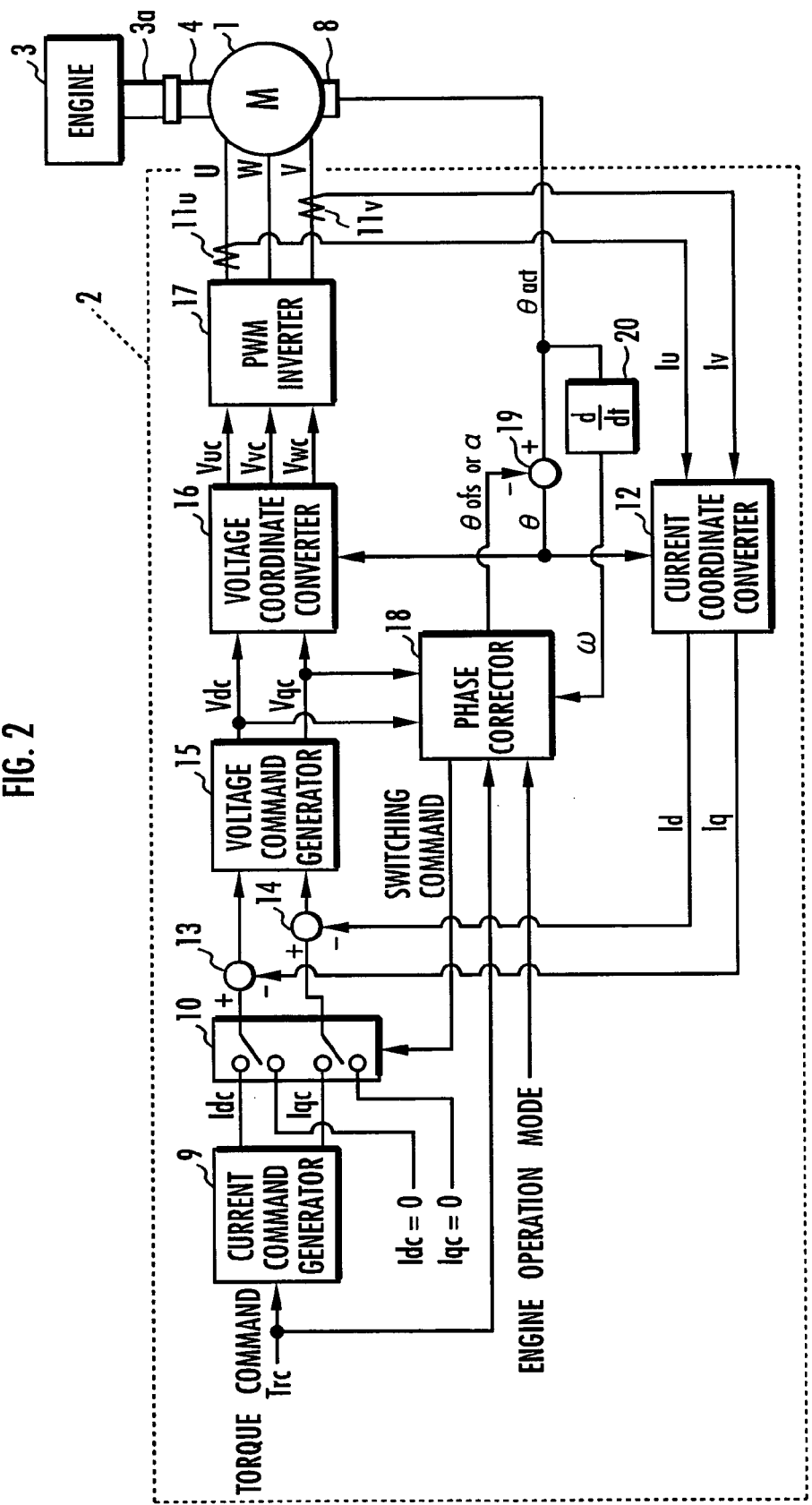
FIG. 2 is a block diagram of a control apparatus according to the present invention.

As shown in FIG. 2, a control apparatus according to the present invention has a permanent-magnet rotary machine 1 (hereinafter referred to as "motor 1") and a motor controller 2 as a current control means for controlling currents of the motor 1.

The motor 1 is mounted on a parallel hybrid vehicle as a prime mover for generating an assistive output (assistive vehicle propulsion force) to assist in the output (vehicle propulsion force) of an engine 3 when necessary. The motor 1 has a rotor 4 connected to an output shaft 3a of the engine 3 for rotation therewith. An output (torque) generated by the rotor 4 and the output of the engine 3 are transmitted to drive wheels of the vehicle through a power transmitting device (not shown) such as a transmission or the like.

Figure 3:
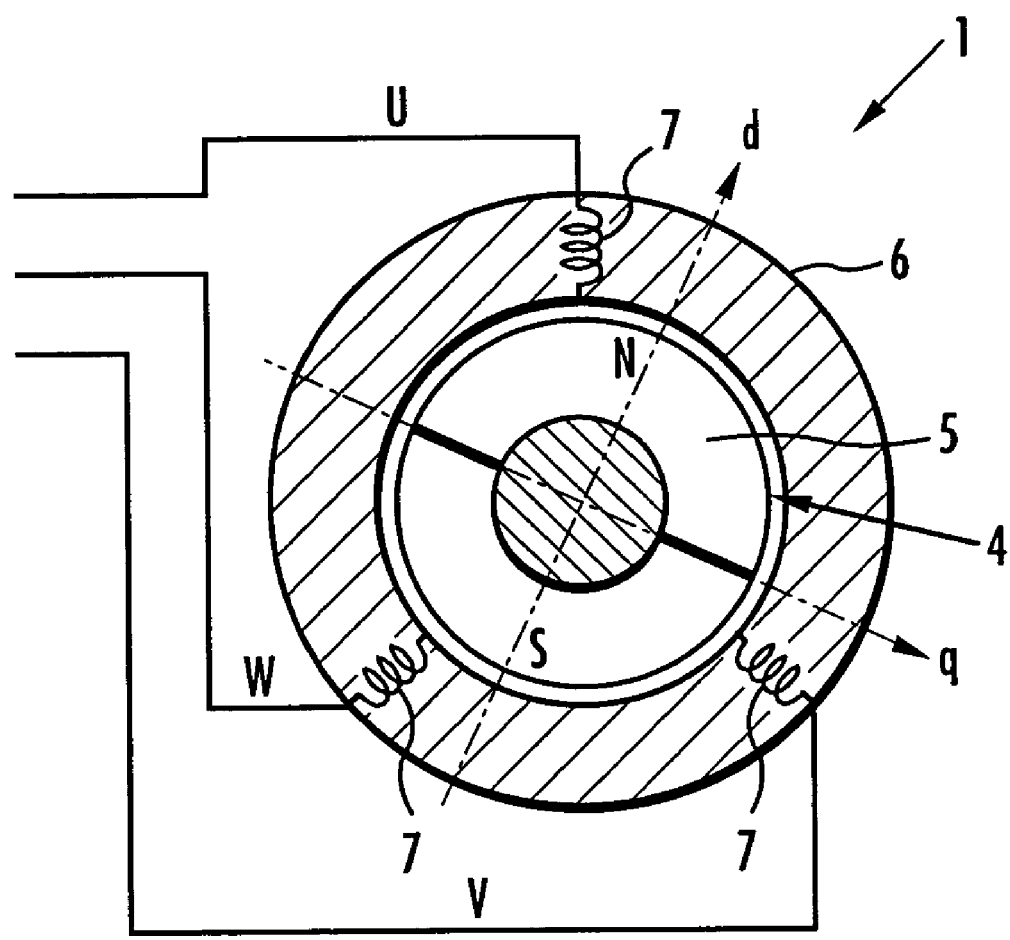
FIG. 3 is a transverse cross-sectional view of a permanent-magnet rotary machine which is controlled by the control apparatus shown in FIG. 2.

The motor 1 comprises a three-phase DC brushless motor. FIG. 3 shows in transverse cross section essential structural details of the motor 1. As shown in FIG. 3, the motor 1 has a rotor 4 comprising a permanent magnet 5 and a stator 6 comprising an armature 7 which is made up of windings in three phases, i.e., U, V, W phases. The permanent magnet 5 is of a cylindrical shape in the present embodiment, but may have salient poles. In FIG. 3, the motor 1 is illustrated in a dq coordinate system which has a d-axis representing the direction of the magnetic field of the permanent magnet 5 of the rotor 4 and a q-axis representing the direction perpendicular to the d-axis.

As shown in FIG. 2, the motor 1 is combined with a magnetic pole position detector (magnetic pole position detecting means) 8 for detecting the positions of the magnetic poles of the rotor 4. The magnetic pole position detector 8 is of a known structure comprising a Hall-effect device, an encoder, or the like. The magnetic pole position detector 8 outputs a signal representative of a detected value of the rotational angle θact of a magnetic pole (the rotational angle of the q-axis) which is displaced from a predetermined reference angular position of the rotor 4, as a detected signal representative of a magnetic pole position. The detected value of the rotational angle θact (hereinafter referred to as "detected magnetic pole angle θact") obtained by the magnetic pole position detector 8 generally suffers an error with respect to the actual magnetic pole position of the rotor 4 (the actual rotational angle of the magnetic poles) due to an assembling error of the magnetic pole position detector 8, etc.

The motor controller 2 serves to control operation of the motor 1 according to the dq vector control process. The motor controller 2 has a current command generator 9 for determining a d-axis current command value Idc and a q-axis current command value Iqc depending on a torque command value Trc which is a command value for a torque to be generated by the motor 1, and a current command switcher 10 for selectively outputting a set (Idc, Iqc) of the d-axis current command value Idc and the q-axis current command value Iqc that are outputted from the current command generator 9 and a set (0, 0) of the d-axis current command value Idc and the q-axis current command value Iqc that are 0, 0, respectively. The torque command value Trc that is supplied to the current command generator 9 is set depending on operating states (an accelerator pedal displacement, etc.) of the vehicle by a processing apparatus (not shown). The current command generator 9 determines a d-axis current and a q-axis current for enabling the motor 1 to generate a torque according to the supplied torque command value Trc, and outputs the d-axis current and the q-axis current respectively as the d-axis current command value Idc and the q-axis current command value Iqc. The current command switcher 10 switches its outputs depending on a command from a phase corrector 18, as described below.

The motor controller 2 also has armature current detectors 11u, 11v for detecting armature currents Iu, Iv that flow respectively through the U and V phases of the armature 7 of the motor 1, and a current coordinate converter 12 for converting the coordinates of the detected values of the armature currents Iu, Iv to calculate a d-axis current Id and a q-axis current Iq in command-axis coordinates dc-qc. Since the armature 7 has three phases, a current flowing through any one of those three phases is uniquely determined by currents flowing through the other two phases. For example, the current flowing through W phase is determined as −(Iu+Iv). According to the present embodiment, therefore, the armature current detectors 11u, 11v detect currents in two phases (the U and V phases in the present embodiment) of the armature 7. The current coordinate converter 12 converts the coordinates of the detected values of the armature currents Iu, Iv using a magnetic pole rotational angle θ that is determined by a subtractor 19 as representing the rotational angle of the magnetic poles of the rotor 4, according to the following equation (4):

$$\begin{bmatrix} Idc \\ Iqc \end{bmatrix} = \sqrt{2} \begin{bmatrix} \sin(\theta + \frac{\pi}{3}) & \sin\theta \\ \cos(\theta + \frac{\pi}{3}) & \cos\theta \end{bmatrix} \begin{bmatrix} Iu \\ Iv \end{bmatrix} \quad (4)$$

Id, Iq that are determined by the above coordinate conversion are significant as a detected value of the d-axis current and a detected value of the q-axis current, respectively, in the command-axis coordinates dc-qc (dq coordinates determined with θ representing the angular position of the d-axis) determined by the magnetic pole rotational angle θ. In the description that follows, Id, Iq will be referred to as a detected d-axis current Id and a detected q-axis current Iq.

The motor controller 2 further includes sub-tractors 13, 14 for determining, respectively, the difference between the d-axis current command value Idc outputted from the current command switcher 10 and the detected d-axis current Id determined by the current coordinate converter 12, and the difference between the q-axis current command value Iqc outputted from the current command switcher 10 and the detected q-axis current Iq determined by the current coordinate converter 12, a voltage command generator 15 for determining a d-axis command value Vdc and q-axis voltage command value Vqc which are command values for voltages to be applied in the directions of respective axes in the command-axis coordinates dc-qc depending on the differences (Idc−Id), (Iqc−Iq), a voltage coordinate converter 16 for converting the coordinates of the d-axis voltage command value Vdc and q-axis voltage command value Vqc thereby to calculate command values Vuc, Vvc, Vwc (hereinafter referred to as "phase voltage command values Vuc, Vvc, Vwc") for voltages to be applied to the respective phases of the armature 7, and a PWM inverter (motor driver) 17 for controlling actual voltages to be applied to the respective phases of the armature 7 according to the phase voltage command values Vuc, Vvc, Vwc.

The voltage command generator 15 basically operates to determine a d-axis command value Vdc and q-axis voltage command value Vqc according to a feedback control law such as a PI control law or the like in order to equalize the differences (Idc−Id), (Iqc−Iq) to "0". The voltage command generator 15 is of a known nature and will not be described in detail below, except that it determines a d-axis voltage command value Vdc and q-axis voltage command value Vqc according to the feedback control law and, in addition, a non-interference control process for compensating for an interference of speed electromotive forces between the d- and q-axes.

The voltage coordinate converter 16 converts the coordinates of the d-axis command value Vdc and q-axis voltage command value Vqc using the same magnetic pole rotational angle θ as the one used in the coordinate conversion performed by the current coordinate converter 12 according to the following equation (5):

$$\begin{bmatrix} Vuc \\ Vvc \\ Vwc \end{bmatrix} = \sqrt{\frac{2}{3}} \begin{bmatrix} \cos\theta & -\sin\theta \\ \cos(\theta - \frac{2}{3}\pi) & -\sin(\theta - \frac{2}{3}\pi) \\ \cos(\theta + \frac{2}{3}\pi) & -\sin(\theta + \frac{2}{3}\pi) \end{bmatrix} \begin{bmatrix} Vdc \\ Vqc \end{bmatrix} \quad (5)$$

The phase voltage command values Vuc, Vvc, Vwc determined by the above coordinate conversion serve to define the magnitudes and phases of the voltages to be applied to the phases U, V, W of the armature 7. The PWM inverter 17 controls the magnitudes (amplitudes) and phases of the voltages to be applied to the phases U, V, W of the armature 7 according to the phase voltage command values Vuc, Vvc, Vwc.

The motor controller 2 also has a phase corrector 18 for determining and outputting a magnetic pole position error angle θofs which represents an error angle of the detected rotational angle θact obtained by the magnetic pole position detector 8 from the actual rotational angle of the magnetic poles, as a magnetic pole position correcting quantity according to the present invention, a subtractor 19 for subtracting the magnetic pole position error angle θofs (hereinafter referred to as "magnetic pole correcting angle θofs") output from the phase corrector 18 from the detected magnetic pole angle θact obtained by the magnetic pole position detector 8 thereby to determine a magnetic pole rotational angle θ (=θact−θofs) used in the coordinate conversion performed by the current coordinate converter 12 and the voltage coordinate converter 16, and a speed calculator 20 for differentiating the detected magnetic pole angle θact to determine a rotational speed (specifically a rotational angular velocity) ω=dθact/dt of the rotor 4 of the motor 1. The rotational speed ω may be detected by an appropriate speed sensor. Alternatively, the rotational speed Ne of the engine 3 which is determined by a rotational speed sensor (not shown) of the engine 3 may be used instead of the rotational speed ω.

The phase corrector 18 corresponds to a correcting quantity determining means according to the present invention. The phase corrector 18, whose processing details will be described later, determines and stores a magnetic pole correcting angle θofs under predetermined conditions, and outputs the stored magnetic pole correcting angle θofs when the motor 1 operates under ordinary conditions other than the predetermined conditions. While the phase corrector 18 is effecting a process of determining the magnetic pole correcting angle θofs, it outputs a temporary setting value α for the magnetic pole correcting angle θofs (hereinafter referred to as "temporary setting correcting angle α"). At this time, the magnetic pole rotational angle θ determined by the subtractor 19 is expressed by θ=θact−α.

For carrying out its process, the phase corrector 18 is supplied with the torque command value Trc, the calculated values of the d-axis voltage command value Vdc and the q-axis voltage command value Vqc from the voltage command generator 15, and the calculated value of the rotational angular velocity ω from the speed calculator 20. The phase corrector 18 is also supplied with data representing an operation mode of the engine 3, e.g., flag data indicative of whether the engine 3 is in a startup mode or not. While the phase corrector 18 is effecting the process of determining the magnetic pole correcting angle θofs, it outputs a switching command to the current command switcher 10 to enable the current command switcher 10 to output the set (0, 0) of the d-axis current command value Idc and the q-axis current command value Iqc that are 0, 0, respectively.

According to the present embodiment, the current command generator 9, the current command switcher 10, the subtractors 13, 14, 19, the voltage command generator 15, the current coordinate converter 12, the voltage coordinate converter 16, the phase corrector 18, and the speed calculator 20 in the motor controller 2 described above are provided as functional means of a microcomputer (including input/output circuits) loaded with a predetermined program.

Details of an operation sequence of the control apparatus according to the present invention will be described below with reference to FIGS. 4 and 5, with the emphasis being given to detailed description of phase corrector 18. When the starter switch (not shown) of the vehicle is turned on, electric energy is supplied to the motor controller 2. In order to operate the motor 1 as a starter motor for the engine 3 to start operating the engine 3, a torque command value Trc is supplied from the non-illustrated processing apparatus to the motor controller 2 as indicated by the second waveform in FIG. 4 (times t1–t2). At this time, the phase corrector 18 outputs a magnetic pole correcting angle θofs that is presently stored to the subtractor 19, and also gives the current command switcher 10 a switching command for outputting the d-axis current command value Idc and q-axis current command value Iqc from the current command generator 9. The motor controller 2 executes the above processing sequences of the current command generator 9, the subtractors 13, 14, 19, the voltage command generator 15, the current coordinate converter 12, and the voltage coordinate converter 16 to cause the motor 1 to generate a torque depending on the torque command value Trc, i.e., a torque for starting the engine 3. The engine 3 is now cranked. At the same time, an engine controller (not shown) operates to perform fuel control and ignition control on the engine 3 to start operating the engine 3 in the startup mode.

Figure 4:
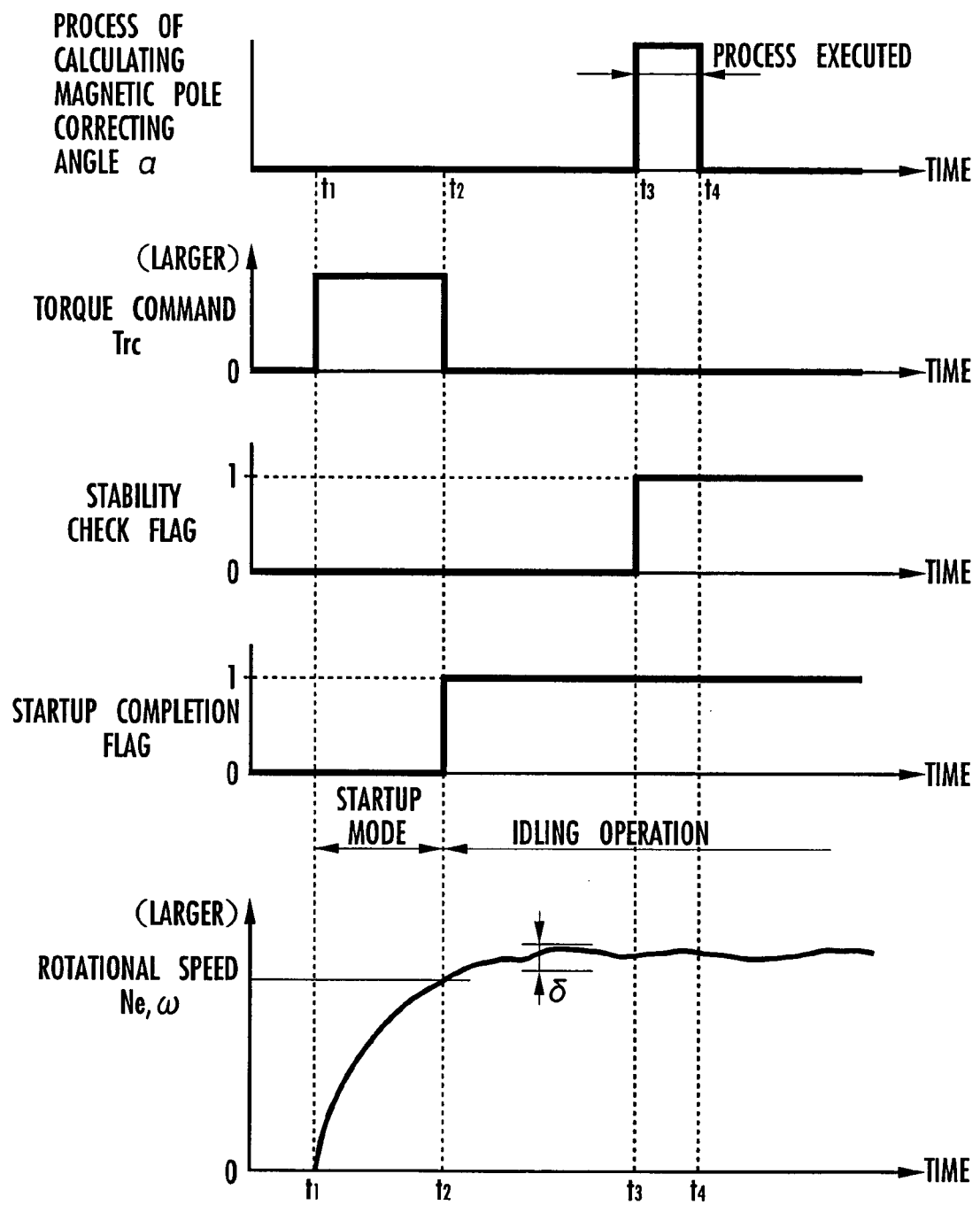
FIG. 4 is a timing chart of an operation sequence of the control apparatus shown in FIG. 2.

When the engine 3 is started, the rotational speed Ne of the engine 3 (which is equal to the rotational angular velocity ω of the motor 1 in the present embodiment) increases, as shown by the fifth waveform in FIG. 4. When the rotational speed Ne reaches a predetermined value or higher, the startup mode of the engine 3 is finished. The engine 3 starts idling, and the torque command value Trc for the motor 1 becomes "0" at time t2 shown in FIG. 4. It is assumed that the accelerator pedal of the vehicle is not operated.

The non-illustrated processing apparatus sets a startup completion flag indicative of whether the startup mode is completed or not to "1", as shown by the fourth waveform in FIG. 4. The startup completion flag is supplied as data indicative of an operation mode of the engine 3 to the phase corrector 18 of the motor controller 2.

Then, as the idling of the engine 3 continues and the rotational speed Ne of the engine 3 or the rotational angular velocity ω of the motor 1 is kept substantially in the vicinity of a predetermined idling rotational speed (e.g., 800 to 1000 rpm), a stability check flag indicative of whether or not the rotational speed of the motor 1 is substantially constant at a predetermined value (e.g., 2000 rpm) or therebelow is set to "1" by the phase corrector 18 at time t3 in FIG. 4. At this time, the phase corrector 18 performs of a process of newly determining the magnetic pole correcting angle θofs (times t3 to t4 in FIG. 4).

Figure 5:
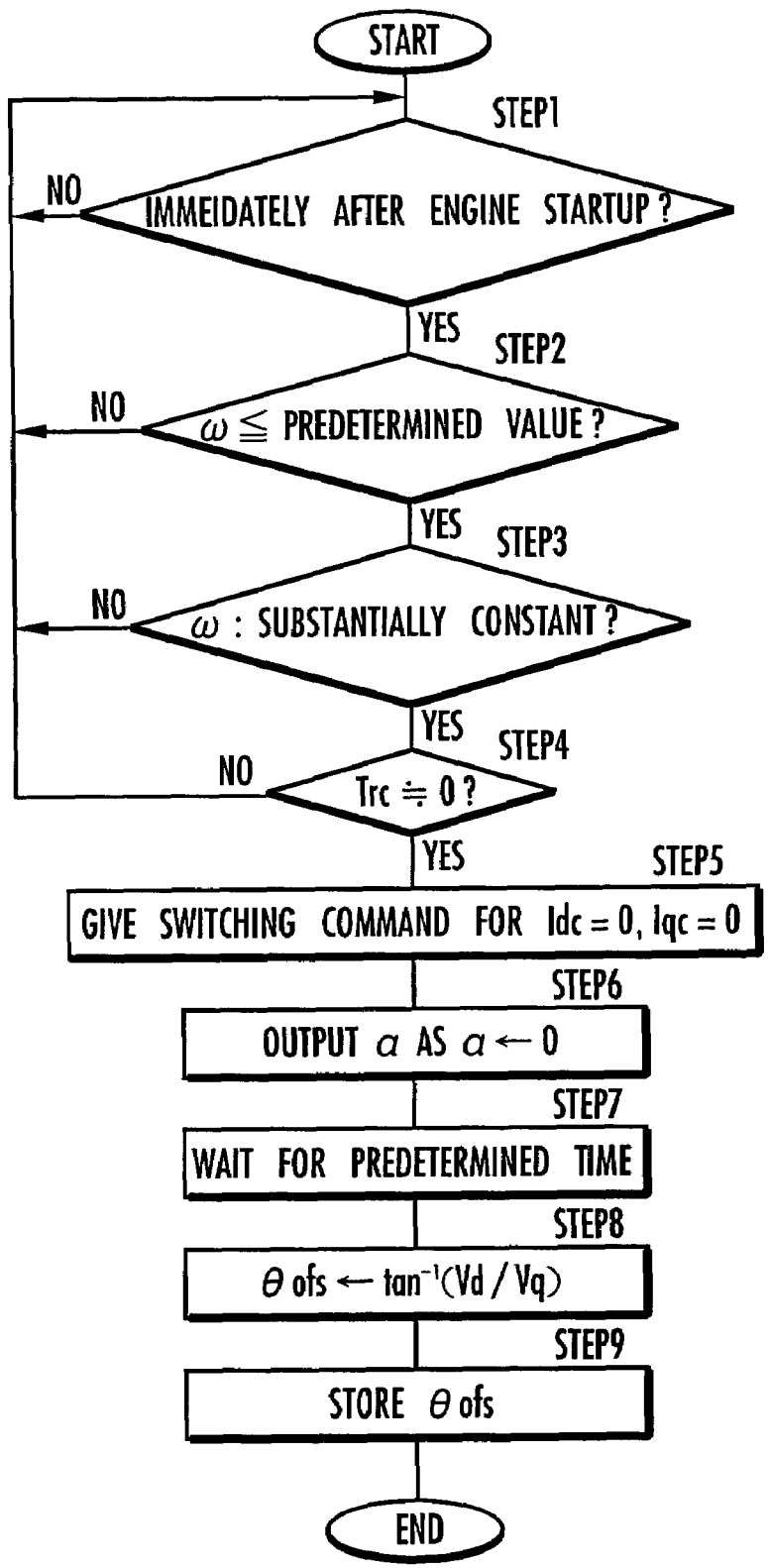
FIG. 5 is a flowchart of an operation sequence of a phase corrector according to a first embodiment of the present invention.

The process of the phase corrector 18 according to the above sequence is performed as shown in FIG. 5.

Specifically, the phase corrector 18 determines whether the present time is immediately after the startup mode of the engine 1 is completed or not based on the value of the startup completion flag (see FIG. 4) in STEP1. If the answer to STEP1 is YES (time t2 in FIG. 4), then the phase corrector 18 determines whether or not the rotational angular velocity ω of the motor 1 is equal to or lower than a predetermined value (e.g., 2000 rpm) in STEP2 and then determines whether or not the rotational angular velocity ω of the motor 1 is equal to or lower than a substantially constant value in STEP3. The decision in STEP3 is based on whether time-dependent changes of the rotational angular velocity ω of the motor 1 as determined by the speed calculator 20 fall within a predetermined range δ (see the fifth waveform in FIG. 4) or not for at least a predetermined period of time. If the answers to STEP2 and STEP3 are YES, then the phase corrector 18 determines whether the toque command value Trc is substantially "0" or not in STEP4. The decision in STEP4 is based on whether the torque command value Trc falls within a predetermined range near "0" or not.

If the answer to STEP4 is YES (i.e., if all the answers to STEP1 through STEP4 are YES), then the phase corrector 18 performs a process from STEP5 to determine the magnetic pole correcting angle θofs as described below. If the answer to any one of STEP1 through STEP4 is NO, then the processing in STEP1 through STEP4 is repeated. When the processing in STEP1 through STEP4 is repeated, the phase corrector 18 outputs the magnetic pole correcting angle θofs that is currently stored.

In STEP5, the phase corrector 18 gives the current command switcher 10 a switching command for enabling the current command switcher 10 to output the d-axis current command value Idc and q-axis current command value Iqc that are "0". The phase corrector 18 then outputs the temporary setting correcting angle α that is set to "0" instead of the magnetic pole correcting angle θofs in STEP6.

The magnetic pole rotational angle θ determined by the subtractor 19 is calculated as θ=θact−α=θact. Therefore, the detected magnetic pole angle θact obtained by the magnetic pole position detector 8 is inputted as it is to the current coordinate converter 12 and the voltage coordinate converter 16 as the magnetic pole rotational angle θ that is used in the coordinate conversion performed by the current coordinate converter 12 and the voltage coordinate converter 16. In this state, the motor controller 2 determines phase voltage command values Vuc, Vvc, Vwc to bring the detected d-axis current Id and the detected q-axis current Iq to their command values of "0", and controls the voltages to be applied to the armature of the motor 1. As a result, actual armature currents, i.e., currents flowing respectively through the phases U, V, W, of the motor 1 are controlled substantially at "0".

After STEP6, the phase corrector 18 waits for a predetermined time in STEP7, and then performs STEP8 as described below. The predetermined time in STEP7 is a time determined in advance as a sufficient time required for the actual armature currents to converge nearly to "0", and may be 0.5 second, for example. Alternatively, instead of waiting for the predetermined time in STEP7, the phase corrector 18 may monitor armature currents detected by the armature current detectors 11$u$, 11$v$, and then may perform STEP8 when the monitored armature currents fall in a predetermined range in the vicinity of "0".

Figure 1:
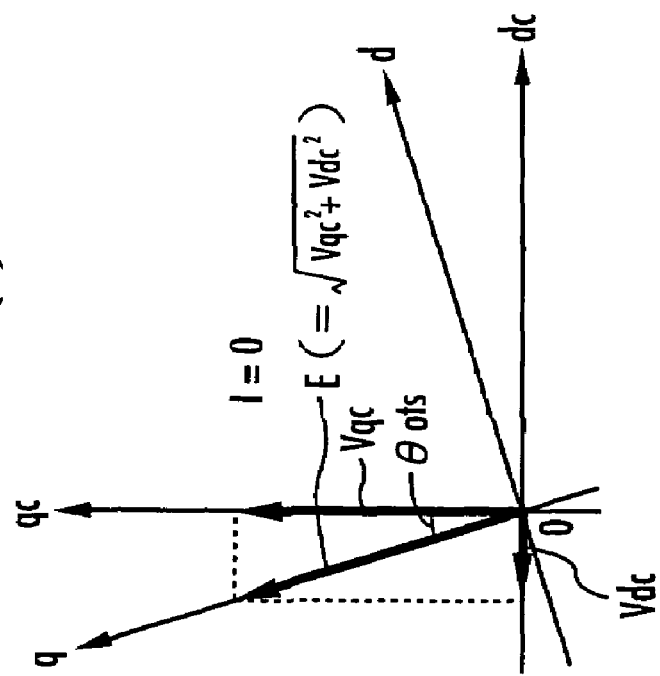
FIGS. 1(a) and 1(b) are diagrams illustrative of the principles of the present invention.
Figure 1:
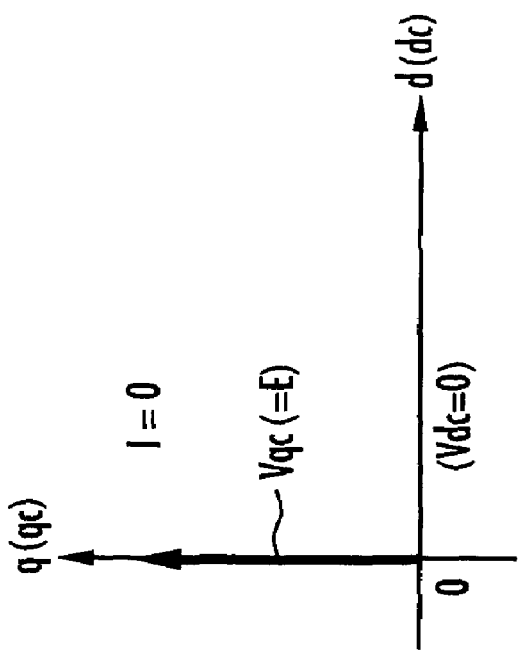

In STEP7, the motor 1 is brought into the zero-current state. Since the rotational angle of the magnetic poles recognized in the dq vector control process of the motor controller 2, i.e., the angular position of the command axis dc shown in FIG. 1(*b*), i.e., the magnetic pole rotational angle θ, is the detected rotational angle θact obtained by the magnetic pole position detector 8, an error angle of the detected rotational angle θact with respect to the actual rotational angle of the magnetic poles is expressed by the above equation (1). In STEP8, therefore, the phase corrector 18 calculates the right side of the equation (1) using the d-axis voltage command value Vdc and the q-axis voltage command value Vqc that are determined by the voltage command generator 15, and then determines the value determined by the calculation the right side of the equation (1) as a new magnetic pole correcting angle θofs. Then, the phase corrector 18 stores the newly determined magnetic pole correcting angle θofs in STEP9, after which the process of determining the magnetic pole correcting angle θofs is put to an end.

Subsequently, the phase corrector 18 outputs the magnetic pole correcting angle θofs stored in STEP9 until it performs the process of determining the magnetic pole correcting angle θofs (STEP5 through STEP9) again, i.e., until the engine 3 resumes its next operation (while the vehicle is in operation). Subsequently, therefore, the magnetic pole rotational angle θ which is produced by subtracting the magnetic pole correcting angle θofs from the detected rotational angle θact is used as representing the actual magnetic pole position of the rotor 4 in controlling the motor 1 with the motor controller 2.

The magnetic pole correcting angle θofs determined in STEP8 represents an error angle of the detected rotational angle θact with respect to the actual rotational angle of the magnetic pole position according to the principles described above with reference to FIG. 1. In the present embodiment, when the rotational speed ω of the motor 1 is equal to or lower than a predetermined value, i.e., when it is not necessary to perform a field weakening control process for intentionally setting the d-axis current command value Idc to a negative value, the process of determining the magnetic pole correcting angle θofs is carried out. Furthermore, when the rotational speed ω of the motor 1 is substantially constant, i.e., when the counter-electromotive forces generated in the respective phases of the armature 7 are substantially constant, the magnetic pole correcting angle θofs is determined. Therefore, the magnetic pole correcting angle θofs can be determined with accuracy. This holds true not only if the permanent magnet 5 of the rotor 4 is cylindrical, but also if it has salient poles.

According to the present embodiment, therefore, the magnetic pole correcting angle θofs can be determined accurately with a simple arrangement irrespective of whether the motor 1 is a cylindrical machine or a salient-pole machine. Since the magnetic pole correcting angle θofs can be determined accurately, the motor efficiency and the power factor can be increased when the motor 1 is operated to generate a torque.

In the above embodiment, the magnetic pole correcting angle θofs is determined according to the equation (1) in STEP8 shown in FIG. 5. However, the magnetic pole correcting angle θofs may be determined according to the equation (2) or (3). In the above embodiment, the temporary setting correcting angle α that is used while the process of determining the magnetic pole correcting angle θofs is being carried out is "0". However, the present value of the magnetic pole correcting angle θofs may be used as the temporary setting correcting angle α. In such a modification, the value determined by calculating the right side of the equation (1) or (2) or (3) may be added to the present value of the magnetic pole correcting angle θofs to determine a new magnetic pole correcting angle θofs in STEP8 shown in FIG. 5.

A second embodiment of the present invention will be described below with reference to FIG. 6. The second embodiment differs from the first embodiment only with respect to the process of determining the magnetic pole correcting angle θofs with the phase corrector 18, i.e., the process corresponding to FIG. 5. Those parts and processing details of the second embodiment which are identical to the parts and processing details of the first embodiment are denoted by identical reference characters and figures, and will not be described in detail below.

Figure 6:
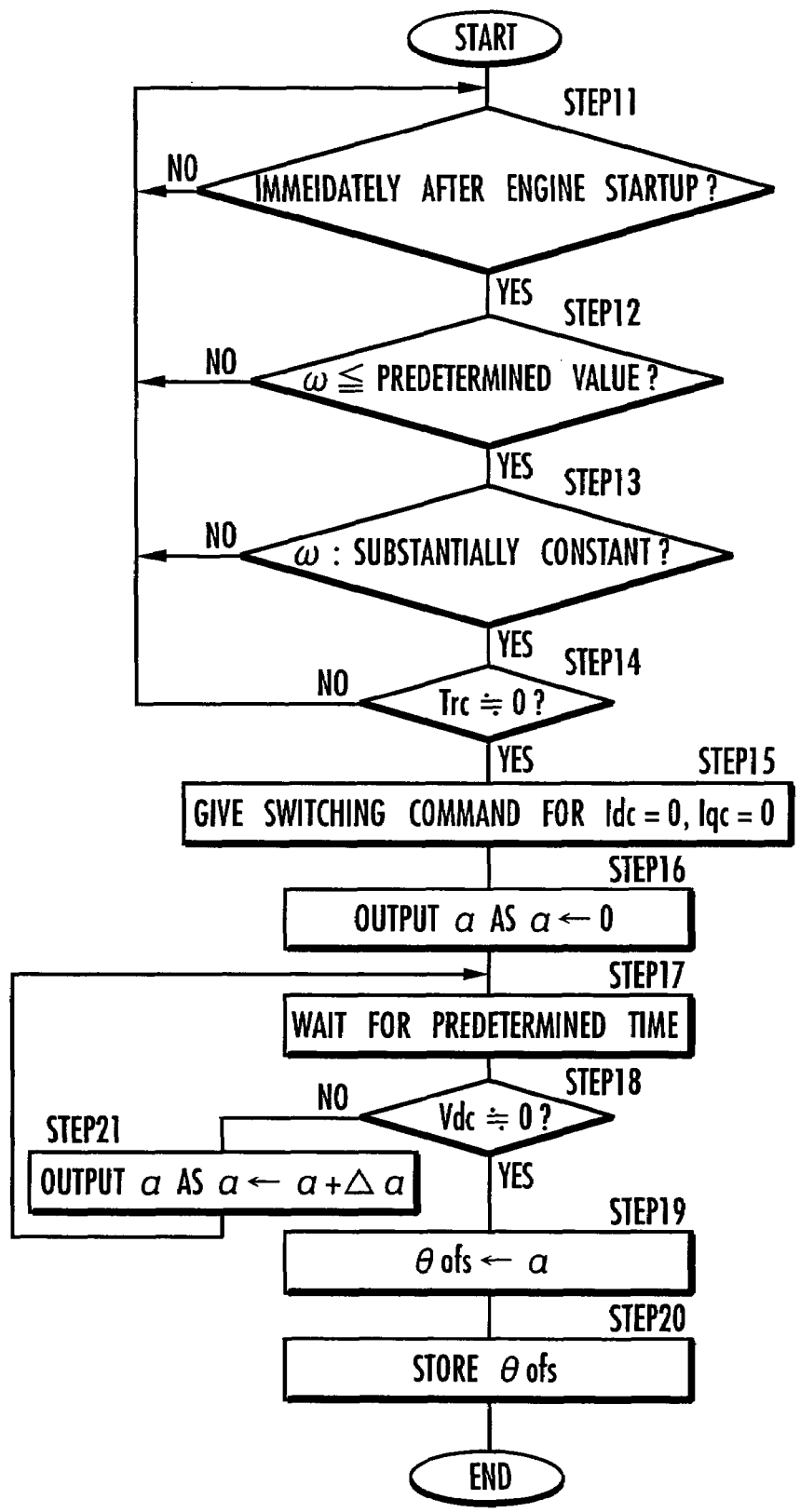
FIG. 6 is a flowchart of an operation sequence of a phase corrector according to a second embodiment of the present invention.

According to the second embodiment, the process performed by the phase corrector 18 to determine the magnetic pole correcting angle θofs is shown in FIG. 6. The decision processing in STEP11 through STEP14 to determine whether conditions for determining the magnetic pole correcting angle θofs are satisfied or not is identical to the decision processing in STEP1 through STEP4 shown in FIG. 5. If the conditions in STEP11 through STEP14 are satisfied, then the phase corrector 18 performs the processing in STEPS 15 through 21 to determine the magnetic pole correcting angle θofs. In the process of determining the magnetic pole correcting angle θofs according to the present embodiment, the temporary setting correcting angle α is set to a plurality of values, and the magnetic pole correcting angle θofs is determined in a searching fashion. Specifically, in STEP15, the phase corrector 18 gives the current command switcher 10 a switching command for enabling the current command switcher 10 to output the d-axis current command value Idc and q-axis current command value Iqc that are "0". The phase corrector 18 then sets the temporary setting correcting angle α to an initial value of, for example, "0" and outputs the temporary setting correcting angle α instead of the magnetic pole correcting angle θofs in STEP16. Then, the phase corrector 18 waits for a predetermined time in STEP17. The predetermined time in STEP17 is a time (e.g., 0.5 second) determined in advance as a sufficient time required for the actual armature currents of motor 1 to converge nearly to "0", as with STEP7 in FIG. 5. Alternatively, instead of waiting for the predetermined time in STEP17, the phase corrector 18 may monitor armature currents detected by the armature current detectors 11*u*, 11*v*, and then may perform STEP18 when the monitored armature currents fall in a predetermined range in the vicinity of "0".

In STEP18, the phase corrector 18 determines whether the d-axis voltage command value Vdc determined by the voltage command generator 15 is substantially "0" or not by determining whether the d-axis voltage command value Vdc falls in a predetermined range near "0" or not. If the answer to STEP18 is YES, then the magnetic pole rotational angle θ which is produced by subtracting the temporary setting correcting angle α presently outputted from the phase corrector 18 from the detected rotational angle θact is substantially in agreement with the actual rotational angle of the magnetic poles of the rotor 4, i.e., the present state is the state shown in FIG. 1(a).

Then, the phase corrector 18 obtains the temporary setting correcting angle α that is presently outputted as the magnetic pole correcting angle θofs in STEP19. In step S20, the phase corrector 18 stores the determined magnetic pole correcting angle θofs, after which the process of determining the magnetic pole correcting angle θofs as shown in FIG. 6 is put to an end.

If the answer to STEP18 is NO, then the magnetic pole rotational angle θ which is produced by subtracting the temporary setting correcting angle α presently outputted from the phase corrector 18 from the detected rotational angle θact is not in agreement with the actual rotational angle of the magnetic poles of the rotor 4, i.e., the present state is the state shown in FIG. 1(b). Then, the phase corrector 18 updates the temporary setting correcting angle α into a value which is greater than the present value thereof by a small predetermined value Δα in STEP21, after which the phase corrector 18 repeats the processing from STEP17.

The value of the temporary setting correcting angle α is thus changed by Δα in each cycle until the d-axis voltage command value Vdc becomes substantially "0", i.e., the value of the temporary setting correcting angle α which makes the d-axis voltage command value Vdc equal to substantially "0" is searched for. The value of the temporary setting correcting angle α that has been searched for is finally obtained and stored as the magnetic pole correcting angle θofs.

The magnetic pole correcting angle θofs thus obtained in STEP19 represents an error angle of the detected rotational angle θact with respect to the actual rotational angle of the magnetic poles according to the principles described above with reference to FIGS. 1(a) and 1(b). As with the first embodiment, since the magnetic pole correcting angle θofs is determined while the rotational speed ω of the motor 1 is equal to or smaller than a predetermined value and is substantially constant, the magnetic pole correcting angle θofs is obtained accurately. This holds true not only if the permanent magnet 5 of the rotor 4 is cylindrical, but also if it has salient poles.

According to the present embodiment, therefore, as with the first embodiment, the magnetic pole correcting angle θofs can be determined accurately with a simple arrangement irrespective of whether the motor 1 is a cylindrical machine or a salient-pole machine. Since the magnetic pole correcting angle θofs can be determined accurately, the motor efficiency and the power factor can be increased when the motor 1 is operated to generate a torque.

In the present embodiment, the initial value of the temporary setting correcting angle α is set to "0". However, the present value of the magnetic pole correcting angle θofs may be used as the initial value of the temporary setting correcting angle α, and the temporary setting correcting angle α may be changed in a range in the vicinity of the initial value.

In the first and second embodiments described above, the magnetic pole correcting angle θofs is determined when the torque command value Trc (demanded torque) for the motor 1 is substantially "0" while the engine 3 is idling immediately after it has started. However, the magnetic pole correcting angle θofs may be determined while the engine 3 is idling with the vehicle being held at a temporary stop. In a situation where the motor 1 is not required to produce a torque, the magnetic pole correcting angle θofs may be determined while the vehicle is cruising. According to such a modification, the decision processing in STEP1 shown in FIG. 5 or the decision processing in STEP11 shown in FIG. 6 may be dispensed with.

According to the present invention, basically, the magnetic pole correcting angle θofs can be determined in a situation where the motor 1 is not required to produce a torque. Therefore, the magnetic pole correcting angle θofs may be determined while the vehicle is running idly with no torque generated by the motor 1, i.e., while the vehicle is running by inertia with the accelerator pedal being not operated to apply no drive force to the drive wheels. According to such a modification, instead of the decision processing in STEP1 shown in FIG. 5 or the decision processing in STEP11 shown in FIG. 6, it is determined whether the accelerator pedal is turned off, i.e., is not operated, or not, and if the answer is YES, then control may go to a next step.

In the first and second embodiments, the magnetic pole correcting angle θofs is determined each time the engine 3 is started. However, the magnetic pole correcting angle θofs may be determined and updated when the production of the vehicle is completed in a production factory or the vehicle is inspected for maintenance, for example. According to such a modification, the worker in the production factory or the inspection worker connects an operation switch for indicating whether the phase corrector 18 is allowed to calculate the magnetic pole correcting angle θofs or not, to the motor controller 2. Before the decision processing in STEP1 shown in FIG. 5 or the decision processing in STEP11 shown in FIG. 6, it is determined whether the operation switch is turned on or not. Only if the operation switch is turned on by the worker, the phase corrector 18 performs the processing sequence from STEP1 or STEP11.

In the first and second embodiments, the present invention has been described with respect the control of the motor 1 mounted on a parallel hybrid vehicle. However, the present invention is also applicable to a permanent-magnet rotary machine that is mounted as a propulsive prime mover on a serial hybrid vehicle. Furthermore, the present invention is also applicable to a permanent-magnet rotary machine (a permanent-magnet motor or a permanent-magnet generator) for use as a prime mover on apparatus other than vehicles.

In the first and second embodiments, the control apparatus has the current command switcher 10, and after it is determined whether the torque command is substantially "0" or not in STEP4 or STEP14, control goes to STEP5 or STEP15. However, as if the present invention is applied to a permanent-magnet generator as an engine-operated generator (a generator having a drive source in the form of an engine), the current command switcher 10 may be dispensed with when the torque command can clearly be confirmed as being "0".

In the first and second embodiments, the motor 1 is controlled by the dq vector control process. However, the magnetic pole correcting angle θofs may be determined while the motor 1 is being controlled in actual operation by a control process other than the dq vector control process. According to such a modification, for determining the magnetic pole correcting angle θofs, a controller for performing the control process other than the dq vector control process inputs phase voltage command values Vu, Vv, Vw to the PWM inverter 17 to control the armature currents of the motor 1 at "0", and the d-axis voltage command value Vdc and the q-axis voltage command value Vqc are determined by the same dq vector control process as with the motor controller 2 according to the first and second embodiments (however, the command values Vdc, Vqc are not used to actually control the motor 1). Then, the magnetic pole correcting angle θofs is determined in the same manner as with the first and second embodiments.

Although certain preferred embodiments of the present invention have been shown and described in detail, it should be understood that various changes and modifications may be made therein without departing from the scope of the appended claims.

What is claimed is:

1. An apparatus for controlling a permanent-magnet rotary machine having a permanent magnet and an armature respectively in a rotor and a stator, comprising:

magnetic pole position detecting means for detecting a magnetic pole position of said rotor;

correcting quantity determining means for determining a magnetic pole position correcting quantity to correct the magnetic pole position detected by said magnetic pole position detecting means; and current control means for controlling an armature current flowing through said armature while controlling the phase of an armature voltage to be applied to said armature depending on the magnetic pole position of said rotor depending on the magnetic pole position which is produced by correcting the magnetic pole position detected by said magnetic pole position detecting means with the magnetic pole position correcting quantity determined by said correcting quantity determining means said correcting means quantity determining means comprising means for performing a dq vector control process which has a d-axis representing the direction of a magnetic field of said rotor and a q-axis representing a direction perpendicular to said d-axis while said rotor is rotating and a command values for both the d-axis current and the q-axis current are being held at zero in said dq vector control process by setting said magnetic pole position correcting quantity to a predetermined temporary setting value, and determining a true value of said magnetic pole position correcting quantity according to a predetermined equation where only a d-axis voltage command value and a q-axis voltage command value are the variables based on the d-axis voltage command value and the q-axis voltage command value which are determined when said dq vector control process is performed, said permanent-magnet rotary machine comprising a rotary machine mounted on a vehicle for generating a propulsive force for propelling the vehicle, and said correcting quantity determining means comprising means for performing a process of determining said magnetic pole position correcting quantity while said vehicle is running idly with no torque generated by said permanent-magnet rotary machine.

2. An apparatus according to claim 1, wherein said correcting quantity determining means comprises means for determining said magnetic pole position correcting quantity when said rotor rotates at a rotational speed which is equal to or lower than a predetermined speed.

3. An apparatus according to claim 1, wherein said correcting quantity determining means comprises means for determining said magnetic pole position correcting quantity when said rotor rotates at a rotational speed which is substantially constant.

4. An apparatus according to claim 1, wherein said permanent-magnet rotary machine comprises a rotary machine mounted on a vehicle for generating a propulsive force for propelling the vehicle, and said correcting quantity determining means comprises means for determining said magnetic pole position correcting quantity when the production of said vehicle is completed or said vehicle is inspected for maintenance.

5. An apparatus for controlling a permanent-magnet rotary machine having a permanent magnet and an armature respectively in a rotor and a stator, comprising:

magnetic pole position detecting means for detecting a magnetic pole position of said rotor;

correcting quantity determining means for determining a magnetic pole position correcting quantity to correct the magnetic pole position detected by said magnetic pole position detecting means; and current control means for controlling an armature current flowing through said armature while controlling the phase of an armature voltage to be applied to said armature depending on the magnetic pole position of said rotor depending on the magnetic pole position which is produced by correcting the magnetic pole position detected by said magnetic pole position detecting means with the magnetic pole position correcting quantity determined by said correcting quantity determining means; and correcting quantity determining means for performing a dq vector control process to control said permanent-magnet rotatry machine in a dq coordinate system which has a d-axis representing the direction of a magnetic field of said rotor and a q-axis representing a direction perpendicular to said d-axis while said rotor is rotating and said armature current is substantially zero, and determining a magnetic pole position correcting quantity to correct the magnetic pole position detected by said magnetic pole position detecting means so that a d-axis voltage command value determined by said dq vector control process will be substantially zero, said current control means comprising means for controlling the phase of said armature voltage with a magnetic pole position which is produced by correcting the magnetic pole position detected by said magnetic pole position detecting means with the magnetic pole position correcting quantity determined by said correcting quantity determining means, said correcting quantity determining means comprising means for performing a dq vector control process which has a d-axis representing the direction of a magnetic field of said rotor and a q-axis representing a direction perpendicular to said d-axis while said rotor is rotating and a command values for both the d-axis current and the q-axis current are being held at zero in said dq vector control process by setting said magnetic pole position correcting quantity to a predetermined temporary setting value, and determining a true value of said magnetic pole position correcting quantity according to a predetermined equation where only a d-axis voltage command value and a q-axis voltage command value are the variables based on the d-axis voltage command value and the q-axis voltage command value which are determined when said dq vector control process is performed, said permanent-magnet rotary machine comprising a rotary machine mounted on a vehicle for generating a propulsive force for propelling the vehicle, and said correcting quantity determining means comprising means for performing a process of determining said magnetic pole position correcting quantity while said engine is operating with no torque generated by said permanent-magnet rotary machine.

6. An apparatus according to claim 5, wherein said correcting quantity determining means comprises means for determining said magnetic pole position correcting quantity when said rotor rotates at a rotational speed which is equal to or lower than a predetermined speed.

7. An apparatus according to claim 5, wherein said correcting quantity determining means comprises means for determining said magnetic pole position correcting quantity when said rotor rotates at a rotational speed which is substantially constant.

8. An apparatus according to claim 5, wherein said permanent-magnet rotary machine comprises a rotary machine mounted on a vehicle for generating a propulsive force for propelling the vehicle for generating a propulsive force for propelling the vehicle, and said correcting quantity determining means comprises means for determining said magnetic pole position correcting quantity when the production of said vehicle is completed or said vehicle is inspected for maintenance.

9. An apparatus for controlling a permanent-magnet rotary machine having a permanent magnet and an armature respectively in a rotor an a stator, comprising:
  magnetic pole position detecting means for detecting a magnetic pole position for said rotor;
  correcting quantity determining means for determining a magnetic pole position correcting quantity to correct the magnetic pole position detected by said magnetic pole position detecting means; and
  current control means for controlling an armature current flowing through said armature while controlling the phase of an armature voltage to be applied to said armature depending on the magnetic pole position of said rotor depending on the magnetic pole position which is produced by correcting the magnetic pole position detected by said magnetic pole position detecting means with the magnetic pole position correcting quantity determined by said correcting quantity determining means; and
  correcting quantity determining means for performing a dq vector control process to control said permanent-magnet rotary machine in a dq coordinate system which has a d-axis representing the direction of a magnetic field of said rotor and a q-axis representing a direction perpendicular to said d-axis while said rotor is rotating and said armature current is substantially zero, and determining a magnetic pole position correcting quantity to correct the magnetic pole position detected by said magnetic pole position detecting means so that a d-axis voltage command value determined by said dq vector control process will be substantially zero;
  said current control means comprising means for controlling the phase of said armature voltage with a magnetic pole position which is produced by correcting the magnetic pole position detected by said magnetic pole position detecting means with the magnetic pole position correcting quantity determined by said correcting quantity determining means,
  said correcting quantity determining means comprising means for performing a dq vector control process which has a d-axis representing the direction of a magnetic field of said rotor and a q-axis representing a direction perpendicular to said d-axis while said rotor is rotating and a command values for both the d-axis current and the q-axis current are being held at zero in said dq vector control process by setting said magnetic pole position correcting quantity to a predetermined temporary setting value, and determining a true value of said magnetic pole position correcting quantity according to a predetermined equation where only a d-axis voltage command value and a q-axis voltage command value are the variables based on the d-axis voltage command value and a q-axis voltage command value are the variables based on the d-axis voltage command value are the variables based on the d-axis voltage command value and the q-axis voltage command value which are determined when said dq vector control process is performed,
  said permanent-magnet rotary machine comprising a rotary machine mounted on a vehicle for generating a propulsive force for propelling the vehicle, and
  said correcting quantity determining means comprising means for performing a process of determining said magnetic pole position correcting quantity while said engine is idling with no torque generated by said permanent-magnet rotary machine.

10. An apparatus according to claim 9, wherein said correcting quantity determining means comprises means for determining said magnetic pole position correcting quantity when said rotor rotates at a rotational speed which is equal to or lower than a predetermined speed.

11. An apparatus according to claim 9, wherein said correcting quantity determining means comprises means for determining said magnetic pole position correcting quantity when said rotor rotates at a rotational speed which is substantially constant.

12. An apparatus according to claim 9, wherein said permanent-magnet rotary machine comprises a rotary machine mounted on a vehicle for generating a propulsive force for propelling the vehicle for generating a propulsive force for propelling the vehicle and said correcting quantity determining means comprises means for determining said magnetic pole position correcting quantity when the production of said vehicle is completed or said vehicle is inspected for maintenance.

* * * * *